United States Patent

Winzen

[15] 3,681,562

[45] Aug. 1, 1972

[54] FILTER DEVICE AND TRANSPARENT COVER

[72] Inventor: John P. Winzen, 2800 Neilson Way, Santa Monica, Calif. 90405

[22] Filed: Jan. 12, 1970

[21] Appl. No.: 2,190

[52] U.S. Cl. .....................210/94, 210/445, 210/451
[51] Int. Cl. ............................................B01d 29/00
[58] Field of Search..........210/94, 95, 445, 450, 451, 210/453, 455

[56] References Cited

UNITED STATES PATENTS

| | | | |
|---|---|---|---|
| 3,236,095 | 2/1966 | Gelder | 210/95 X |
| 3,352,197 | 11/1967 | Porges et al. | 210/94 X |
| 3,400,575 | 9/1968 | Madden | 210/94 X |
| 1,495,825 | 5/1924 | Gunten | 210/455 X |
| 2,038,348 | 4/1936 | Cusin | 210/455 X |
| 3,031,082 | 4/1962 | Smith | 210/445 X |

Primary Examiner—Samih N. Zaharna
Attorney—Sanford Astor

[57] ABSTRACT

The invention relates to a see-through or transparent in-line filter device which is designed so that it can be inserted into a fluid line wherein there can be obtained a constant reading of the particulate contaminant in the fluid stream which passes through the filter device.

There are many systems, particularly dealing with aerospace applications and processes wherein the contamination in a fluid stream must be known to the controller on a constant or periodic basis.

2 Claims, 2 Drawing Figures

PATENTED AUG 1 1972    3,681,562
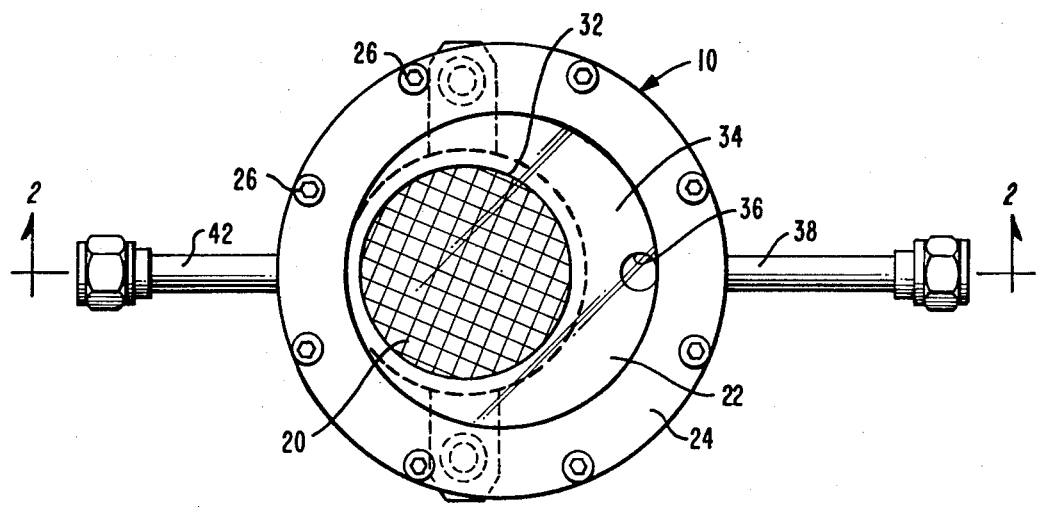
FIG.—1
FIG.—2
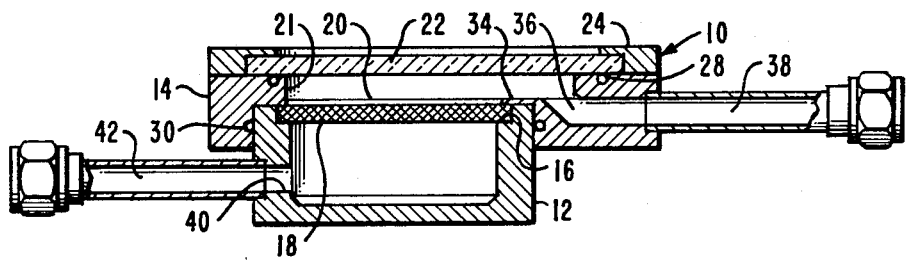
INVENTOR.
JOHN P. WINZEN
BY Sanford Astor
ATTORNEY

FILTER DEVICE AND TRANSPARENT COVER

At present, the only method for measuring the contaminant level in a fluid flow is to take a filter pad, wash it, read the contaminant level, place it in a sampling bomb, bolt the bomb into the line, pass the fluid through, remove the bomb, take it to a clean room, remove the filter, and place it under a microscope for reading.

Another method now used is to take a sample of the fluid from the line into a container and carry the container to a clean room where it is poured through a filter and read.

These methods have great difficulties and drawbacks. At any step in the process where the filter is removed from the bomb to be read or the fluid is placed in a container and carried, contaminants may be introduced to or lost from the fluid system and an incorrect reading will result.

The requirement for an accurate reading is so severe that a slight variation may lead to a serious problem in the whole process.

It is an object of this invention to provide a device for reading contaminant levels in a fluid stream without the possibility of incorrect readings due to the introduction to or loss of contaminants.

It is a further object of this invention to provide a device which will read the contaminant level in a fluid stream in-line, without the possibility of the introduction to or loss of contaminants which would give an incorrect reading.

Still a further object of this invention is to provide a device which is lightweight, may be fitted into a fluid stream and is transparent and yet shallow enough in height so that it may fit under a microscope and the contaminants read by the operator.

Some of the objects of the invention having been stated, other objects and features will become apparent from the following detailed description when read in connection with the accompanying drawings in which:

FIG. 1 is a plan view of the device of the present invention.

FIG. 2 is a sectional view taken along lines 2—2 of FIG. 1.

Referring more specifically to the drawings FIG. 1 and FIG. 2, illustrate the filter plate assembly 10 of the present invention. The assembly 10 comprises a lower plate 12 to which is fixedly attached a cover plate 14. Said attachment may be made by any convenient means such as bolting or clamping.

Seated on a lip 16 of lower plate 12 is a support plate 18 which provides support for the filter element 20. Support plate 18 may be any known filter support element such as a screen manufactured by Millipore or Gelman.

In juxtaposition with cover plate 14 at the upper edge thereof is a transparent sealing surface or cover, sight glass 22 which is held in a fixed position to cover plate 14 by cover flange 24. Cover flange 24 may be fixed to cover plate 14 by any means such as bolts 26 (not shown in FIG. 2) or clamps or any other known method.

An O-ring 28 is placed between sight glass 22 and cover plate 14 near the outer edge of each, to provide a fluid tight seal between sight glass 22 and cover plate 14.

An O-ring 30 is placed between lower plate 12 and cover plate 14 to provide a fluid tight seal between lower plate 12 and cover plate 14.

Cover plate 14 is annular and comprises an opening 32, a ledge 34, and an inlet passage 36 which opens on to ledge 34 so that the fluid stream may pass into the enlarged opening formed between the sight glass 22, the filter element 20 and the inner surface 21 of cover plate 14.

It is preferred for best results that opening 32, which is preferably circular, is positioned substantially concentrically with filter element 20 so that the entering fluid stream passes from ledge 34 onto filter element 20. Ledge 34 provides an increased flow area which causes a reduction in the velocity of the entering fluid and further distributes said fluid over filter element 20 at a relatively constant velocity to provide even distribution of particulate matter on said filter element 20. This gives an even distribution of the fluid and the contaminants to make particulate examination easier and allow statistical counting, whereby, a small portion of the filter area may be analyzed and multiplying factors employed to determine the number of particles on the entire area.

Inlet line 38 is fixedly attached to cover plate 14 such as by threading or welding so that the fluid stream to be tested is introduced to inlet passage 36 of cover plate 14.

The fluid stream after passing through filter 20 is received in lower plate 12 and exits through exit passage 40 into exit line 42.

The in-line filter device of the present invention can be placed in the main line of the fluid stream or it may be placed in a parallel line designed to receive a representative sample from the main stream. It could be placed in the main line if the flow rate were low enough and if it was necessary or desirous to analyze the whole stream flow.

The filter element itself may be any known filtering material however, the preferred filter material is a membrane type filter, such as those manufactured by Millipore Corporation or Gelman Corporation. A metallic screen can be used but a membrane filter provides finer openings and an easier reading surface.

The critical dimension in providing the in-line filter device of the present invention is the distance between the top of the filter membrane and the top of the transparent cover of the device. This distance must be such that the device may be placed under the objective lens of a microscope which will give a magnification of 100 times, which is necessary to analyze the contaminant particles. The device as described provides this dimension for commonly used microscopes.

There is a fluid tight seal between the filter element and the lower plate and cover plate which is provided by the filter element itself. Therefore no fluid can leak at this interface.

The use of the in-line device of the present invention allows the reading of contaminants in the stream on a progressive basis; such as at each 100 milliliters of flow and does not limit the readings which may be taken on a predetermined amount of fluid as in the previous methods. This provides an additional advantage of being able to take a reading shortly after connection to read the contamination which is introduced by connection, because it is not necessary to remove the filter element for a reading.

The sample can be analyzed outside of a clean area, whereas previous methods required preparation of the filter membrane for microscopic analysis to be accomplished in a clean area to minimize contamination. While this device must be loaded in a clean room, once loaded, the readings may be taken on the spot at the point of the fluid stream flow at which the reading is required.

Having fully described the invention and its utilities, it is desired that the invention be limited only by the scope of the appended claims.

I claim:

1. A filter device comprising, in combination:

a filter means;

a support means beneath said filter means for supporting said filter means, said filter device having a closed region disposed beneath said filter means and having an outlet, said support means having a ledge forming a surface substantially contiguous and substantially coplanar with said filter means; an inlet located on said ledge remotely from said filter means to direct fluids passing therethrough across said ledge and upwardly therefrom to a location above said filter means, the area of said ledge being of a size sufficient to cause a substantial reduction in velocity of fluids entering through said inlet;

a cover means including a transparent portion permitting said filter means to be inspected without disassembling the filter device, said cover means juxtaposed to said support means to form a second closed region between said support means and said cover means, said second closed region being disposed above said filter means and said ledge, with said inlet communicating with said second closed region permitting fluid to enter from said inlet, pass across said ledge, disperse into said second closed region, flow downwardly through said filter into said first mentioned closed region and exit through said outlet.

2. The device of claim 1 in which the distance between the top of the filtering means and the top of the transparent cover is small enough to be placed under the objective lens of a microscope which will give a magnification of 100 times.

* * * * *